US007962576B2

(12) United States Patent
Spens et al.

(10) Patent No.: US 7,962,576 B2
(45) Date of Patent: Jun. 14, 2011

(54) QUANTITY CONVERSION INTERFACE FOR EXTERNAL PROGRAM CALLS (75) Inventors: Guenter Spens, Dallas, TX (US); Ralf Mueller, Angelbachtal (DE); Markus Seng, Berlin (DE)

(73) Assignee: SAP AG, Walldorf (DE)

( * ) Notice: Subject to any disclaimer, the term of this patent is extended or adjusted under 35 U.S.C. 154(b) by 1873 days.

(21) Appl. No.: 10/896,037

(22) Filed: Jul. 22, 2004

(65) Prior Publication Data
US 2006/0020685 A1 Jan. 26, 2006

(51) Int. Cl.
G06F 15/16 (2006.01)

(52) U.S. Cl. ......... 709/219; 705/29; 705/30; 715/211; 703/10; 73/23.2; 73/53.04; 73/204.11; 73/204.26; 73/861; 73/195; 73/196; 73/197; 73/198; 73/199; 73/200; 73/201

(58) Field of Classification Search ......... 702/9, 14; 709/219; 705/29–30; 715/211; 703/10; 73/23.2, 53.04, 53.05, 204.11, 204.26, 861, 73/195–201
See application file for complete search history.

(56) References Cited

U.S. PATENT DOCUMENTS

| | | | | |
|---|---|---|---|---|
| 3,906,198 A * | 9/1975 | November | ........... | 702/46 |
| 5,287,469 A * | 2/1994 | Tsuboi | ........... | 711/103 |
| 5,974,237 A * | 10/1999 | Shurmer et al. | ........... | 709/224 |
| 6,256,634 B1 * | 7/2001 | Moshaiov et al. | ........... | 1/1 |
| 6,334,126 B1 * | 12/2001 | Nagatomo et al. | ........... | 1/1 |
| 6,381,616 B1 * | 4/2002 | Larson et al. | ........... | 707/201 |
| 6,427,125 B1 * | 7/2002 | Gzara et al. | ........... | 702/9 |
| 6,651,514 B2 * | 11/2003 | Zanker | ........... | 73/861.52 |
| 6,782,403 B1 * | 8/2004 | Kino et al. | ........... | 1/1 |
| 6,851,115 B1 * | 2/2005 | Cheyer et al. | ........... | 719/317 |
| 6,853,920 B2 * | 2/2005 | Hsiung et al. | ........... | 702/1 |
| 6,938,036 B2 * | 8/2005 | Dettinger et al. | ........... | 707/3 |
| 7,162,498 B2 * | 1/2007 | Nomoto et al. | ........... | 1/1 |
| 7,171,379 B2 * | 1/2007 | Menninger et al. | ........... | 705/28 |
| 7,295,849 B2 * | 11/2007 | Ghabra et al. | ........... | 455/502 |
| 7,319,414 B2 * | 1/2008 | Horstemeyer | ........... | 340/994 |
| 7,334,019 B2 * | 2/2008 | Quick et al. | ........... | 709/206 |
| 7,357,719 B2 * | 4/2008 | Yamato et al. | ........... | 463/43 |
| 7,382,741 B2 * | 6/2008 | Rao | ........... | 370/255 |
| 7,552,076 B1 * | 6/2009 | Uenohara et al. | ........... | 705/36 R |
| 7,693,839 B2 * | 4/2010 | Daniels et al. | ........... | 705/26 |
| 2002/0178168 A1 * | 11/2002 | Daniels et al. | ........... | 707/100 |
| 2003/0023756 A1 * | 1/2003 | Awamoto et al. | ........... | 709/246 |
| 2003/0137693 A1 * | 7/2003 | Nishio | ........... | 358/1.15 |
| 2003/0212564 A1 * | 11/2003 | Sawabe et al. | ........... | 704/500 |
| 2003/0217071 A1 * | 11/2003 | Kobayashi et al. | ........... | 707/102 |
| 2004/0002841 A1 * | 1/2004 | Mayuzumi et al. | ........... | 703/7 |
| 2004/0015505 A1 * | 1/2004 | Quick et al. | ........... | 707/100 |
| 2004/0024662 A1 * | 2/2004 | Gray et al. | ........... | 705/29 |
| 2004/0042395 A1 * | 3/2004 | Lu et al. | ........... | 370/225 |
| 2004/0073925 A1 * | 4/2004 | Kinoshita | ........... | 725/46 |
| 2004/0083204 A1 * | 4/2004 | Dettinger et al. | ........... | 707/3 |

(Continued)

Primary Examiner — Khanh Q Dinh
Assistant Examiner — Saket K Daftuar
(74) Attorney, Agent, or Firm — Kenyon & Kenyon LLP (57) ABSTRACT The application is directed to methods, systems, procedures, networks and storage apparatus used to conduct conversions of data using remote conversion servers. In one embodiment of the present invention, recent query results may be stored and then used to solve subsequent conversions rather than querying a remote conversion server when the same conversion was previously completed. A counter may be referenced to determine if too much time has passed since the original query was stored in the buffer and, if too much time has passed, the buffer may be cleared and the remote conversion server may be queried to convert the pending data. The resulting conversion may be stored for subsequent use.

39 Claims, 6 Drawing Sheets

U.S. PATENT DOCUMENTS

2005/0027670 A1* 2/2005 Petropoulos ............... 707/1
2005/0192991 A1* 9/2005 Nomoto et al. ............. 707/101
2005/0197860 A1* 9/2005 Joffe et al. ................ 705/2
2005/0246487 A1* 11/2005 Ergan et al. ............... 711/113
2005/0289144 A1* 12/2005 Dettinger et al. ........... 707/9
2006/0167935 A1* 7/2006 Atarashi et al. ............ 707/104.1

* cited by examiner

| Leading Header | Query Parameters | Dummy Frame |
|---|---|---|
| 401 | 402 | 403 |

QUANTITY CONVERSION INTERFACE FOR EXTERNAL PROGRAM CALLS

FIELD OF THE INVENTION

The present invention includes systems, methods, and apparatus for providing output data from a calculation server remote from the source of the input data. More specifically, the present invention includes systems, methods, and apparatus used in conjunction with remote calculation servers to convert and equate rheological parameters of an oil or gas product from current measured conditions to standard reference conditions.

BACKGROUND

Oil and gas are extracted from subterranean reservoirs, stored, refined, and transported around the globe to meet the world's ongoing demand for energy. As oil and gas are moved throughout the petroleum handling network (from exploration facility, to production facility, to storage facility) they must be accounted for and measured. Likewise, as oil and gas are stored at different facilities within the petroleum production network they, too, must be accounted for and measured. In each instance, the oil and gas are subject to changes in temperature, viscosity, and pressure that may affect their volume as well as their other measurable parameters. Consequently, when a shipment is sent or received and when stored product is measured over time, its temperature, volume, specific gravity, and other parameters must be measured and then calibrated to some standardized rheological conditions in order to properly account for or reconcile the quantity of petroleum product. Moreover, by converting shipments and stored volumes of petroleum products to standardized conditions, the integrity of storage and handling systems can be verified and more accurate and fair business transactions can be conducted.

The applicable standard conditions for oil and gas are generally set by both industry standards and governmental regulations. Accordingly, the applicable standardized conditions for a specific shipment or store of petroleum may vary from region to region and from country to country.

To help facilitate the proper conversions to standardized conditions, the American Petroleum Institute (API), the American Gas Association (AGA), and other regulating bodies provide conversion servers that may be used to make the requisite conversions. These conversion servers are often relied upon by members of the industry for accurate product conversions employing the most current rules and regulations of the applicable governing body. These conversion servers typically accept queries containing the rheological conditions of a quantity of product and typically return answers describing the measurements of that same product at "standard conditions." The converted data may be in the same or different units of measure. By using these remote conversion servers, a requestor does not need to account for specific differences that may exist from jurisdiction to jurisdiction. Rather, a requestor can simply rely on the third-party for accurate conversions that comply with an individual jurisdiction's specific conversion requirements.

DETAILED DESCRIPTION

The application is directed to methods, systems, procedures, networks and storage apparatus used to conduct conversions of data using remote conversion servers. In one embodiment of the present invention, recent query results may be stored and then used to solve subsequent conversions rather than querying a remote conversion server when the same conversion was previously completed. A counter may be referenced to determine if too much time has passed since the original query was stored in the buffer and, if too much time has passed, the buffer may be cleared and the remote conversion server may be queried to convert the pending data. The resulting conversion may be stored for subsequent use.

In addition to checking for local storage and the spoliation of stored data, the present invention may also verify the integrity of the query to be sent to the remote conversion server. This verification may include confirming user authorization to request the conversion and confirming the remote conversion server is registered to make the requested conversions. For one, certain users may only have authorization to perform certain permissible conversions. Likewise, certain conversion servers may be authorized to make only certain conversions. Thus, the user's level of authority may be checked against the user's pre-authorization and the scope of the query may be checked against the authorization level for the server prior to the query being sent to the remote server for conversion.

Still further, to maintain flexibility in the query, empty frames with dummy routines of standard code may also be used. These routines may be readily accounted for and modified by the user. They may also be fashioned to provide an interface with the conversion servers without extensive or even minimal "negotiation."

There are numerous other embodiments of the present invention as made evident by the remainder of the specification and the pending claims.

Figure 1:
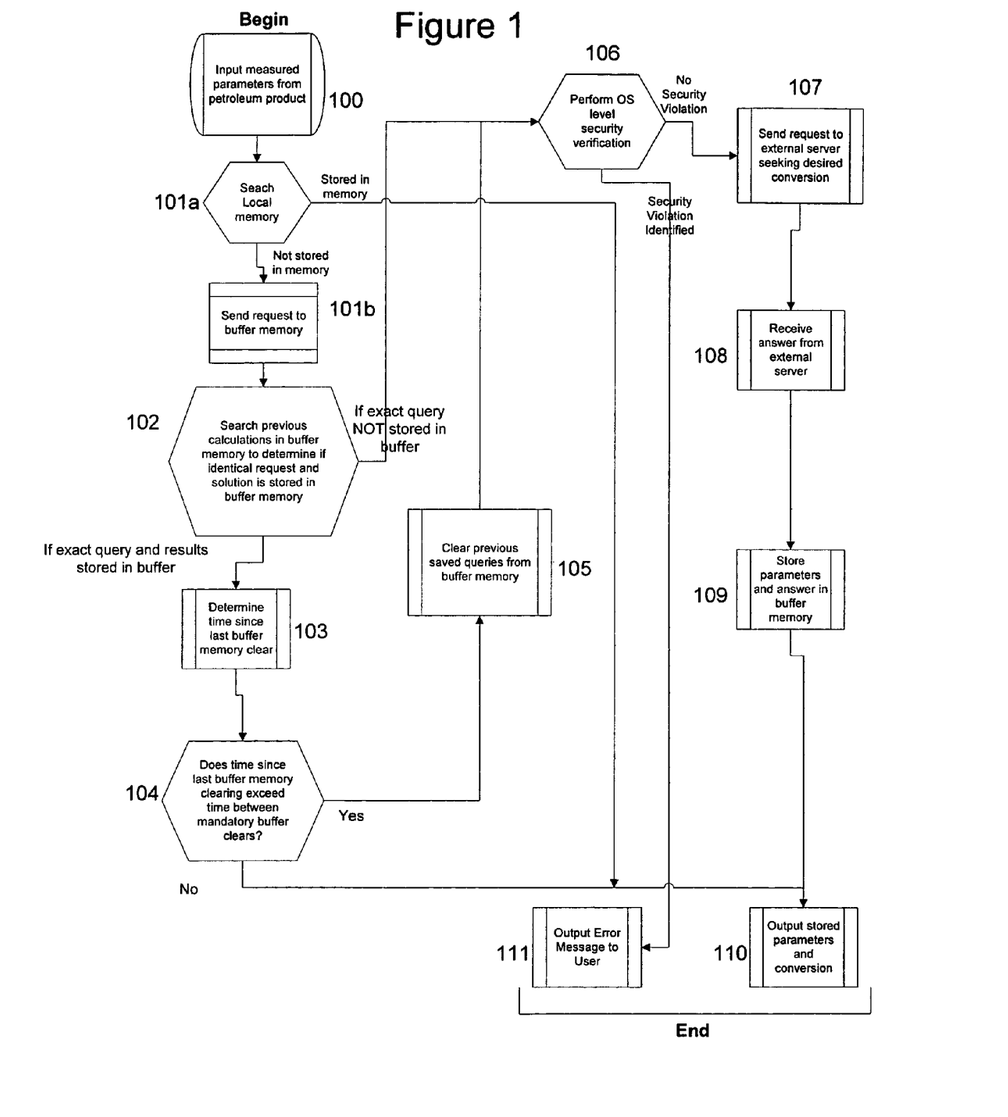
FIG. 1 is a flow chart describing a method for converting input data in accord with the present invention.

FIG. 1 is flow chart describing a system, method or device that may be employed in accord with the present invention. The underlying system or method may be carried out in the sequence described in FIG. 1 as well as in other sequences. In carrying out this embodiment of the present invention, some or all of the steps identified in FIG. 1 may be employed. Additional steps, described below, may be employed as well.

The method embodied in FIG. 1 may begin at 100 with the rheological parameters of a shipment or store of a petroleum product, such as crude oil or natural gas, being measured and then input into a computer programmed in accord with the present invention. The parameters or measurements of the petroleum product may be taken manually, by sensors, and by some combination of the two. These parameters may be manually input into the computer at step 100 or they may be input through various other methods, including automatically by sensors interfacing with the product at issue. The manual measurement techniques employed may include product line sampling and stick measurements while the automatic techniques employed may include the use of pressure sensors and depth gauges. The parameters being measured may include the specific gravity, temperature, density, volume, base sediment, water content, and pressure as well as other appropriate parameters. The actual parameters that are sampled may depend upon the type of product being sampled, where in the handling chain the sample is taken, and the requirements of the governing weights and measures body.

Once the current parameters defining the product are input at step 100, local memory may be searched at 101*a* to determine if the last search completed marches the new search, if it does, step 110 is next, if it doesn't step 101*b* may follow. At step 101*b* a query to facilitate the search of previous stored conversions may be generated. This query may include data signifying each of the measured parameters as well as the location of the product and the time and date that the measurements were taken. At step 102 a storage buffer may be searched to determine if a materially identical search had been completed and is stored in the buffer. If a match to the current query is found in the buffer a counter may be checked at step 103 to determine how much time has passed since the last buffer purge. A match may be found if most or all of the material parameters are identical or similar to a previous search. The range of variance for each parameter, to determine if a match exists, may vary from product to product and from parameter to parameter. In a preferred embodiment, the range of equivalents or matches would be within industry standards and in compliance with local jurisdictional requirements. The buffer being searched may be embodied in various storage devices employing volatile or non-volatile memory. The buffer may be locally accessible near where the data is input as well as remotely positioned and accessible over a network.

At step 104, a counter may be queried to determine the age of the data stored in the buffer. When the age of the data exceeds a pre-selected time limit some or all of the data may be cleared from the buffer. This time limit may be set by an administrator and may vary by product, by jurisdiction or by some other variable. The amount of time between partial or complete buffer clears can be seconds, months or some other time period. If too much time has passed, step 105, which is directed to querying a remote server for the answer, may follow, while if too much time has not passed, step 110, which is directed to outputting data stored on the buffer, may follow. When data is output under step 110, it may be output to a storage device, a computer screen, and to numerous other output devices. The data may be output to numerous other devices as well.

When too much time since the last buffer clear has elapsed and step 105 is completed, the buffer memory may be cleared of all or only some previous conversions. For instance, only those stored conversions over 120 days old may be purged while all those less than 120 days old may remain. Likewise, only those conversions related to the queried product may be deleted while conversions related to other products may remain. Thus, the buffer may be selectively purged. There may be other reasons and methods of to clearing the buffer as well.

Having determined that a query need be sent to a remote conversion server, the query may be checked as shown at step 106. A security check of the query may be performed to verify that the user is authorized to make the query and that the conversion server is authorized to receive the query. This security check may be performed at the operating system level. If a security violation is detected an error message may be output as shown in step 111. Alternatively, if no security violation is found, a query containing the measured rheological parameters may be sent to a remote conversion server as shown in step 107. This remote conversion server may be positioned across a wide area network as well as over the world wide web. Once the conversion is complete, the converted results may be output by the remote conversion server and sent back to the user as shown in step 108. The query results may be received by the same local server or computer that sent the query as well as others configured to receive responses from the remote conversion servers. As shown in step 109, the query results may be stored in the buffer for later access and usage. At the same time or before or after the query, results showing the converted parameters to standard local Theological conditions may be output as shown in step 110.

The buffer in this embodiment as well as in others may be local or may be remote and accessible via a network. In a preferred embodiment, the buffer would be accessible by numerous terminals over a wide area network. In so doing, the buffer, and ultimately the users, could have access to a greater number of past queries.

A system programmed in accord with this invention may include a single personal computer as well as a network of computers each completing a portion of the process. This personal computer may, in addition to receiving data from the user or a sensor, also receive and verify password information from the user prior to carrying out any of the steps of the present invention. In this and the other embodiments, a portion of the parameters characterizing the product may be converted by the remote server while the remainder of them, such as the BB6 (barrel at 60° F.), BBL, LTO (long ton), UG6 (U.S. gallon at 60° F.), and UGL (U.S. gallon at same conditions as transaction quantity) may be completed locally using the output data from the remove server. In so doing the queries to the remote server can be streamlined and shortened.

The parameters that may be measured for liquid products include the material temperature, the test density, and the test temperature at which the test density is measured. The vapor pressure (for liquid petroleum gases) along with the base sediment and water BSW content, may also be measured. The parameters that may be measured for gases include material temperature and pressure, test density, test temperature, test pressure, test heating value, and the test temperature and pressure at which the test heating value is measured. Examples of the quantity conversion standards that may apply or govern the conversions include IOS 91-1; ISO 91-2; ASTM D 4311; ASTM D 1555; API 2540; ANSI/API 2530-92; and GPA TP 25.

An example of a conversion that may be completed by a system or method of the present invention would include starting with existing data to be converted of: 1) 1000 BBL of crude oil at 75° F. product temperature having a density of 12° API at 70°-F; and 2) a base sediment and water content of 2% and finishing with converted data of: 1) 974,865 BB6 (Barrel at 60° F.); 2) 1,000,000 BBL (original quantity); 3) 153,871 LTO (Long Ton); 4) 40,944,322 UG6 (U.S. gallon at 60° F.); 5) 41,160,000 UGL (U.S. gallon at same conditions as transaction quantity); and 6) base density at 60° F.; 11.5° API. The base density and the volume correction to 60 F in this example may be calculated by the conversion server while the remainder of the calculations may be completed locally. Alternatively, the entire conversion or some other conversion sub-set may be completed at the conversion server while the remainder is filled in once the server is satisfied.

Figure 2:
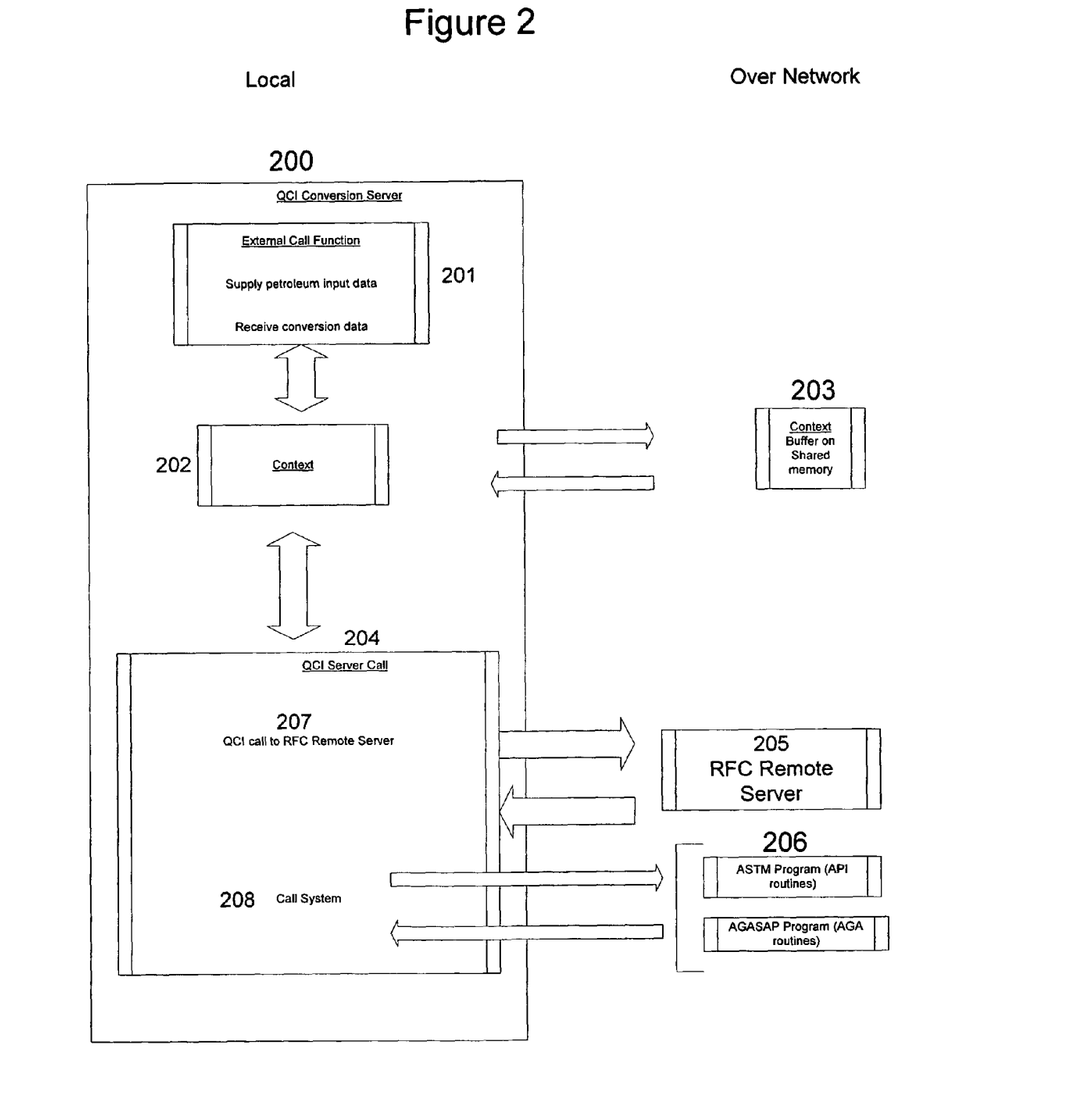
FIG. 2 is a block diagram of various sub-routines that may be used in accord with the present invention.

FIG. 2 is a block diagram of several systems and methods that may be employed to carry out discrete modules of the present invention. These modules may be broken down with these call routines as well as with others, i.e., certain modules may perform more or less functionality than those depicted in FIG. 2, while remaining within the spirit and scope of the present invention. The left side of FIG. 2 shows modules that may be performed locally, while the right side of FIG. 2 shows modules and servers that may be accessible over a network.

FIG. 2 contains local modules and objects 201, 202, and 204, and remote modules and servers 203 and 205. The local modules and objects in this embodiment may be run locally while the remote modules and servers may be accessible over a network. In this embodiment the call function module 201 within QCI Conversion Server 200, may be used to accept petroleum input data and to convert it to SI units for subsequent handling. It may also be used to accept completed conversion data and output the data to a user interface, to a storage unit or to some other device. Still further, the call function 201 may also interact with the context function object 202 which, itself, may be used to communicate with the remote buffer memory module 203 and the QCI Server call module 204. When communicating with the remote buffer 203, the context object 202 may both send and receive queries containing conversion parameters. The context object 202 may, instead, conduct a search of the remote buffer and then, if a match is found, extract the requisite converted parameters from the buffer 203. When the context 202 receives query results from the QCI Server module it may output those results to the Call Function 201 as well as send the data to the buffer 203 for storage. The buffer 203 may be purged of data and refreshed from time to time. It may be refreshed every hour, over the course of several months and at other periods as well.

The QCI server call module 204 may be used to communicate with the remote servers performing the conversions. Thus, after the appropriate security measures have cleared, the QCI server call sub-routine 204 may communicate with remote server 205 to obtain the proper conversions of the data. The QCI server may also perform additional calculations based upon the data received from the remote server 205 in order to standardize parameters not calculated by the remote server 205. The RFC call 207 within the QCI server 204 may be used to communicate with the RFC remote servers 205 for security and other purposes the call system sub-routines 208 may be used to access the API and the AGA servers directly.

While FIG. 2 shows the context object 202 acting sequentially between the QCI server call 204 and the call function 201, the modules and objects may communicate with each other rather than being only linked in this manner. Likewise, the other modules, servers, and objects may be linked with each other and to one another in other configurations as well.

The RFC Remote Server 205, which can communicate with the API and the AGA servers 206, is depicted on the right side of FIG. 2, which reflects that these servers may be located apart from the local terminal. Comparatively, the context object 202 and the other objects and modules may be local or may be running on remote servers within a wide area network with the user log in, interface, and product sampling being performed locally. As noted above, by searching a shared memory buffer, not only can recent queries from the local terminal or area be searched and considered, but other queries from remote areas also served by the network may be searched as well.

Figure 3:
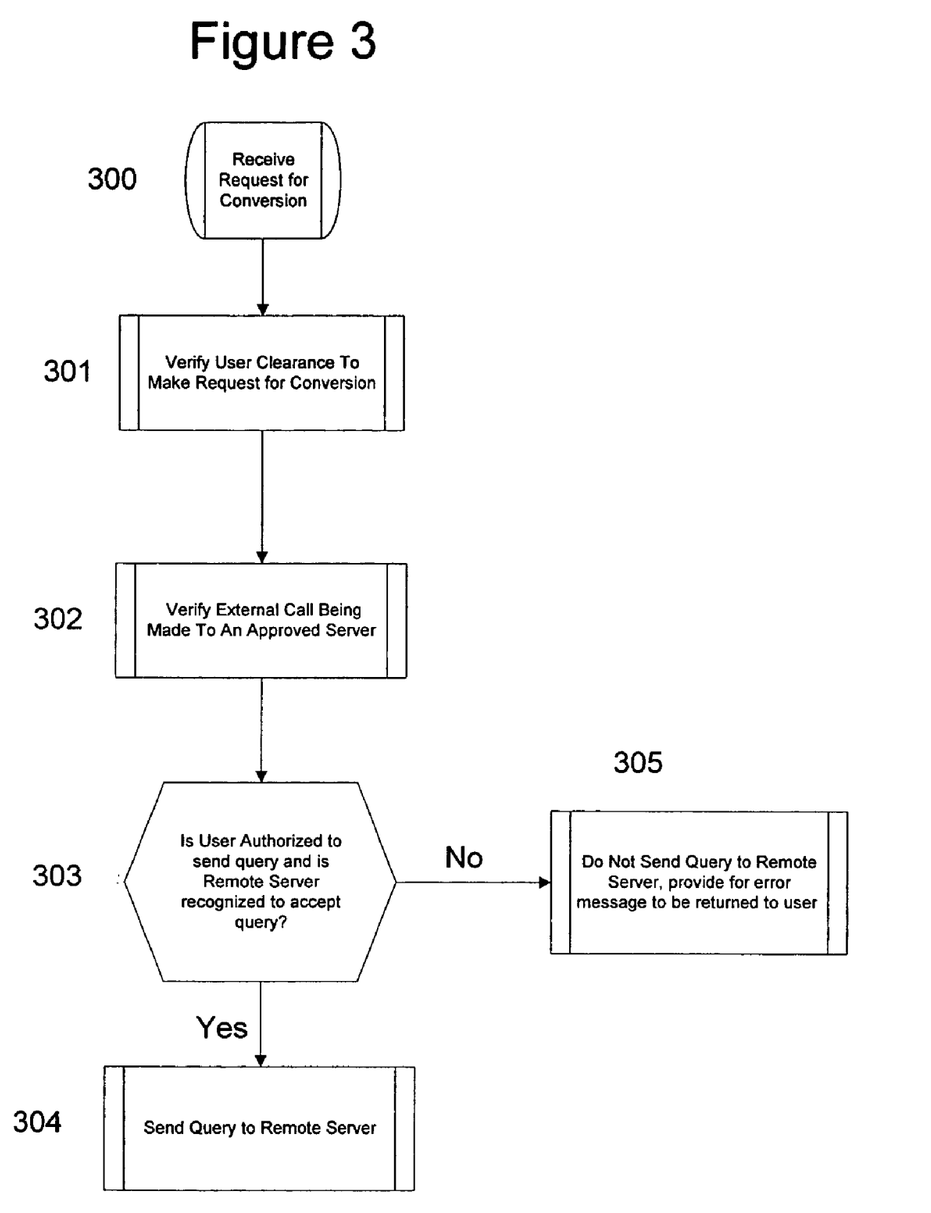
FIG. 3 is a flow chart of a security sub-routine that may be used in accord with the present invention.

FIG. 3 contains a security module or sub-routine that may be used in accord with the present invention. This sub-routine may be employed at step 106 of FIG. 1 as well at other times during the conversion of the parameters. In each instance, it is preferred that the security sub-routine be run prior to a query being sent to a remote server for calculation. In FIG. 3 a request to convert parameters is received at 300, this request may include the actual parameters to be converted and the profile information of the requestor. This profile information may be compared to a database of approved users at step 301. This comparison may verify that the user is authorized to use the system as well as check to see if the user is authorized to make the specific query in question. In some instances, a user may only be allowed to query certain products or certain parameters. For example, one user may only have clearance to query parameters associated with liquid products while another may only have authorization to query for gaseous products.

At step 302 the subroutine may verify that the query is being sent to an approved external server. For instance, it may verify that the server is known or that the server is approved for that particular jurisdiction. Likewise, it may also verify that the server is approved for that type of conversion. If the user or the server is not authorized for that particular query the query may be rejected at step 303. Conversely, if both the user and the server pass verification, the query may be forwarded on by the sub-routine in step 304.

Figure 4:
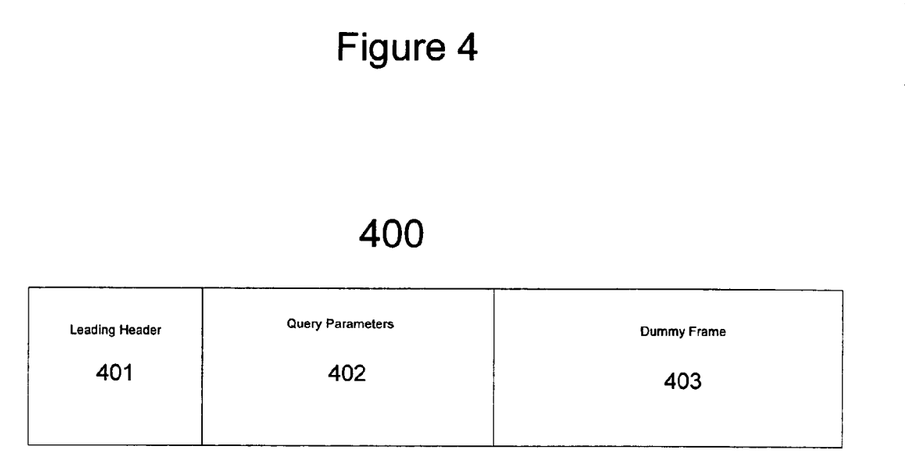
FIG. 4 is a request structure that may be employed in accord with the present invention.

FIG. 4 is an example of a query that may be performed at the operating system level in accord with the present invention. The query 400 may include a header 401 or other leading information, data or query parameters 402, and dummy frames 403. The leading header information 401 may include location and user information while the parameter frame 402 may include a matrix of parameters for conversion. The dummy frame 403 may contain dummy routines, default information or other information for the specific external servers. By inserting these dummy routines into the query, a user or his or her specific interface need not provide this information to receive conversions from the remote servers. Rather, the routines may satisfy the specific requests of the individual remote servers. Thus, by providing the dummy routines in frame 403, different user interfaces, which would not otherwise provide the requisite operating system level information to the remote server, may be used without the need for further input or programming by a user. Thus, the QCI server may be "clamped on" to existing user interface software as that software wouldn't need to provide the requisite external server call information when these dummy frames are employed.

Figure 5:
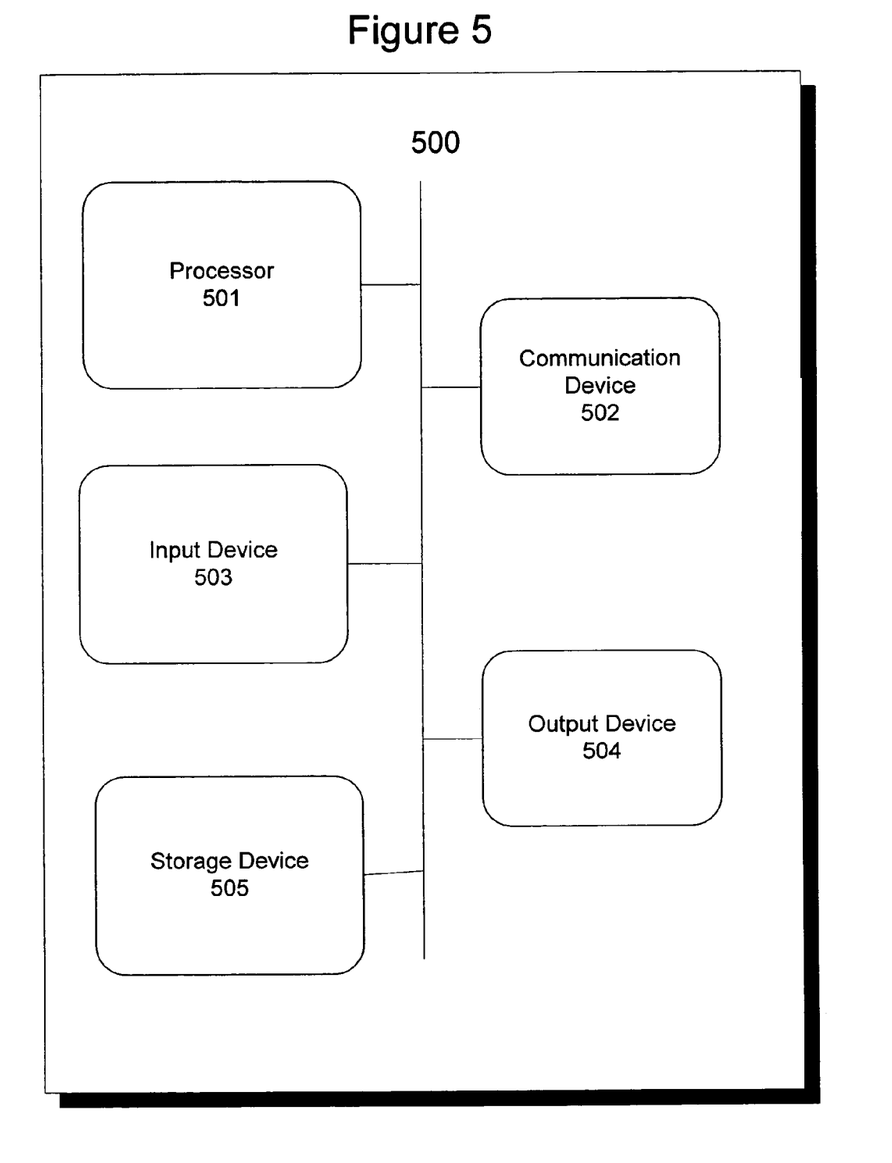
FIG. 5 is a schematic of a computer that may employed in accord with the present invention.

FIG. 5 is a schematic of a computer that may be employed in accord with the current invention. The computer 500 of FIG. 5 includes a processor 501, a communication device 502, an input device 503, an output device 504, and a storage device 505. Each of these devices may communicate with each other over the bus 506. The storage device may store some or all of the sub-routines and methods described above.

Figure 6:
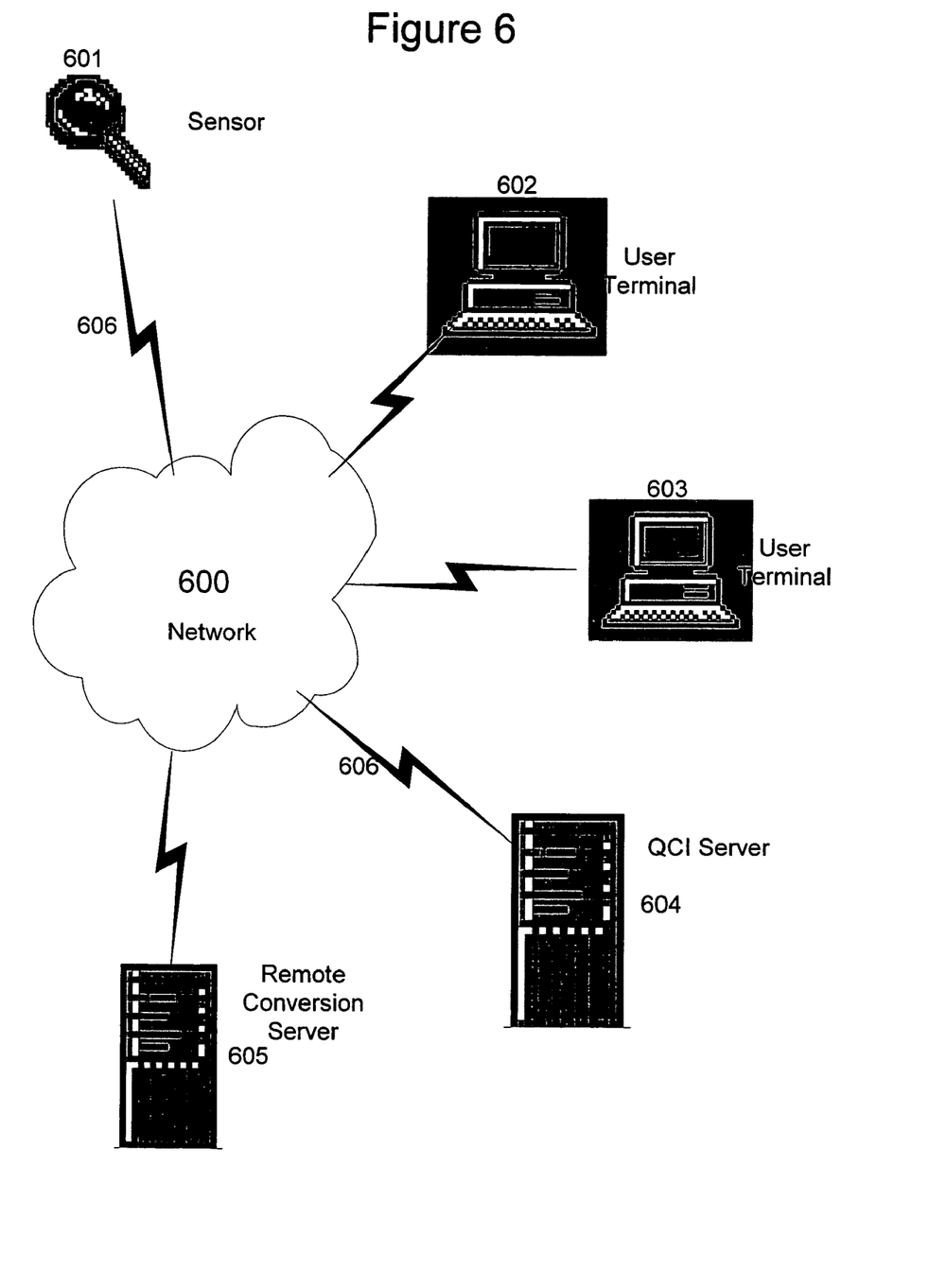
FIG. 6 is a schematic of a network that may employed in accord with the present invention.

FIG. 6 is a network that may be employed in accord with the current invention. A sensor 601, user terminals 602 and 603, QCI Server 604 and Remote Conversion Server 605 are shown in this figure. Sensor 601 and terminals 602 and 603 may be used to provide the input data for subsequent conversion while the QCI server 604 may be used to receive that data and communicate with the Remote Conversion Server 605. Each of these components may communicate with each other via the network 600.

While various systems, methods and apparatus have been discussed above, other embodiments of the present invention are also plausible. For one, the subroutines described herein may be run in the order provided as well as in different orders. Likewise, certain subroutines may be excluded or duplicated in certain embodiments. In any event, the systems and methods described herein may be stored on volatile and non-volatile storage media such as a CD-ROM, a floppy disk, and local ROM and may be employed stand alone computers as well as terminals and remote servers.

What is claimed is:

1. A system for querying a remote server over a network, the system comprising:
a processor wherein the processor is adapted to:
detect generation of input data containing measured parameters of a substance, wherein the measured parameters are rheological measurements of a petroleum product,
search a network-addressable storage memory device to determine if conversion results corresponding to the measured parameters are stored therein from a prior conversion procedure, wherein the conversion results include volumetric conversions, and
if the conversion results are stored in the storage memory device, provide the stored conversion results from the prior conversion procedure from the storage memory device,
if the conversion results are not stored in the storage memory device,
transmit a query with the measured parameters to a service at the remote server over the network,
receive computed conversion results in response thereto,
provide the computed conversion results from the remote server, and
store the computed conversion results in the storage memory device, wherein the stored computed conversion results are accessible for a future conversion procedure from the storage memory device.

2. The system of claim 1 wherein the processor is further adapted to perform a security verification on a user of the system prior to sending the query to the remote server.

3. The system of claim 1 wherein the rheological measurements of the petroleum product have been sensed by a remote sensor interfacing with the product.

4. The system of claim 2 wherein the security verification includes verifying that the user is authorized to convert the requested types of data.

5. The system of claim 1 wherein the processor is further adapted to perform a security verification of the remote server to verify that the server is authorized to complete a requested conversion.

6. The system of claim 1 wherein the conversion results are conversions to industry standard parameters.

7. The system of claim 1 wherein the conversion results were derived from an American Petroleum Institute, API, conversion server.

8. The system of claim 1 wherein the conversion results were derived from an American Gas Association, AGA, conversion server.

9. A programmable storage memory device storing instructions for a processor, the processor having communication inputs and communication outputs, the instructions comprising:
instructing the processor to recognize the presence of input data containing measured parameters of a substance, wherein the measured parameters are theological measurements of a petroleum product;
instructing the processor to search a network-addressable computer storage memory device to determine if conversion results for the measured parameters are stored in the storage memory device from a prior conversion procedure, wherein the conversion results include volumetric conversions; and
if the conversion results are stored in the storage memory device, instructing the processor to output the stored conversion results in response to the input data from the prior conversion procedure from the storage memory device,
otherwise, instructing the processor to query a conversion service in response to the input data, to receive a query response including computed conversion results, and to output the computed conversion results in response to the input data from the remote server, wherein the computed conversion results are stored in the storage memory device and are accessible for a future conversion procedure from the storage memory device.

10. The device of claim 9 further comprising instructions to perform a security verification on a user of the processor prior to sending the query.

11. The device of claim 9 wherein the rheological measurements of the petroleum product have been sensed by a remote sensor interfacing with the product.

12. The device of claim 10 wherein the security verification includes verifying that the user is authorized to convert the requested types of data.

13. The device of claim 9 further comprising instructions to perform a security verification of a remote conversion server to verify that the server is authorized to complete a requested conversion.

14. The device of claim 9 wherein the conversion results are conversions to industry standard parameters.

15. The system of claim 1 wherein the conversion results were derived from an American Petroleum Institute, API, conversion server.

16. The system of claim 1 wherein the conversion results were derived from an American Gas Association, AGA, conversion server.

17. A quantity conversion method, comprising:
responsive to a request to perform a standard condition conversion calculation, the request including rheological conditions of a petroleum product, comparing the rheological conditions against stored conditions of prior calculations maintained in a network-addressable storage memory device,
if the comparison yields a match, retrieving conversion results associated with the rheological conditions from the storage memory device and outputting the retrieved conversion results as a response to the request from prior calculations from the storage memory device, wherein the conversion results include volumetric conversions,
otherwise, referring the rheological conditions to a standard conversion agent via a network and receiving conversion results therefrom, and
outputting the received conversion results as the response to the request, wherein the received conversion results are stored in the storage memory device and are accessible for a future calculation from the storage memory device.

18. The method of claim 17 further comprising performing a security verification on a user prior to referring rheological conditions to the standard conversion agent.

19. The system of claim 1, wherein the storage memory device is a local memory.

20. The system of claim 19, wherein the local memory stores only the results of preceding conversion procedure.

21. The system of claim 1, wherein the storage memory device is a buffer device.

22. The system of claim 21, wherein the buffer device is a local device.

23. The system of claim 21, wherein the buffer device is a remote device accessible via the network.

24. The system of claim 21, wherein the buffer device stores a plurality of conversion results.

25. The system of claim 21, wherein the processor is further adapted to determine whether the stored conversion results have been stored in the buffer device for longer than a preselected time period,
- if the stored conversion results have not been stored in the buffer device longer than the preselected time period, provide the stored conversion results in the response to the input data,
- otherwise, erase the stored conversion results and transmit the query.

26. The device of claim 9, wherein the storage memory device is a local memory.

27. The device of claim 26, wherein the local memory stores only the results of preceding conversion procedure.

28. The device of claim 9, wherein the storage memory device is a buffer device.

29. The device of claim 28, wherein the buffer device is a local device.

30. The device of claim 28, wherein the buffer device is a remote device accessible via a network.

31. The device of claim 28, wherein the buffer device stores a plurality of conversion results.

32. The device of claim 28, further comprising instructions to determine whether the stored conversion results have been stored in the buffer device for longer than a preselected time period,
- if the stored conversion results have not been stored in the buffer device longer than the preselected time period, provide the stored conversion results in the response to the input data,
- otherwise, erase the stored conversion results and transmit the query.

33. The method of claim 17, wherein the storage memory device is a local memory.

34. The method of claim 33, wherein the local memory stores only the results of preceding conversion procedure.

35. The method of claim 17, wherein the storage memory device is a buffer device.

36. The method of claim 35, wherein the buffer device is a local device.

37. The method of claim 35, wherein the buffer device is a remote device accessible via the network.

38. The method of claim 35, wherein the buffer device stores a plurality of conversion results.

39. The method of claim 35, wherein the processor is further adapted to determine whether the stored conversion results have been stored in the buffer device for longer than a preselected time period,
- if the stored conversion results have not been stored in the buffer device longer than the preselected time period, provide the stored conversion results in the response to the request,
- otherwise, erase the stored conversion results and refer the rheological conditions to the standard conversion agent.

* * * * *